(12) United States Patent
Gassoway

(10) Patent No.: US 8,042,180 B2
(45) Date of Patent: Oct. 18, 2011

(54) INTRUSION DETECTION BASED ON AMOUNT OF NETWORK TRAFFIC

(75) Inventor: Paul Gassoway, Norwood, MA (US)

(73) Assignee: Computer Associates Think, Inc., Islandia, NY (US)

(*) Notice: Subject to any disclaimer, the term of this patent is extended or adjusted under 35 U.S.C. 154(b) by 1041 days.

(21) Appl. No.: 11/133,962

(22) Filed: May 20, 2005

(65) Prior Publication Data

US 2005/0262562 A1    Nov. 24, 2005

Related U.S. Application Data

(60) Provisional application No. 60/573,591, filed on May 21, 2004.

(51) Int. Cl.
*H04L 29/06* (2006.01)
*H04L 29/14* (2006.01)

(52) U.S. Cl. .............. 726/22; 726/23; 726/24; 726/25

(58) Field of Classification Search ............ 726/22–25
See application file for complete search history.

(56) References Cited

U.S. PATENT DOCUMENTS

| | | | |
|---|---|---|---|
| 5,623,600 A | 4/1997 | Ji et al. | |
| 5,842,002 A | 11/1998 | Schnurer et al. | |
| 5,948,104 A | 9/1999 | Gluck et al. | |
| 6,131,163 A * | 10/2000 | Wiegel | 726/12 |
| 6,301,668 B1 * | 10/2001 | Gleichauf et al. | 726/25 |
| 6,370,648 B1 * | 4/2002 | Diep | 726/22 |
| 6,557,920 B1 | 5/2003 | Hobson et al. | |
| 7,017,186 B2 * | 3/2006 | Day | 726/23 |
| 7,065,482 B2 * | 6/2006 | Shorey et al. | 709/224 |
| 7,080,000 B1 | 7/2006 | Cambridge | |
| 7,287,278 B2 * | 10/2007 | Liang | 726/22 |
| 7,343,624 B1 * | 3/2008 | Rihn et al. | 726/24 |
| 7,359,930 B2 * | 4/2008 | Jackson et al. | 709/200 |
| 7,409,714 B2 * | 8/2008 | Gupta et al. | 726/23 |
| 7,434,297 B1 * | 10/2008 | Sutton et al. | 26/24 |
| 7,512,808 B2 * | 3/2009 | Liang | 713/188 |
| 7,565,692 B1 * | 7/2009 | Maria | 726/23 |
| 2002/0147780 A1 | 10/2002 | Liu et al. | |
| 2002/0166063 A1 | 11/2002 | Lachman et al. | |
| 2003/0110396 A1 | 6/2003 | Lewis et al. | 713/201 |

(Continued)

FOREIGN PATENT DOCUMENTS

GB    2 362 076 A    11/2001

(Continued)

OTHER PUBLICATIONS

Frank Apap, Andrew Honig, Shlomo Hershkop, Eleazar Eskin, and Sal Stolfo; "Detecting Malicious Software by Monitoring Anomalous Windows Registry Accesses"; Springer-Verlag Berlin Heidelberg 2002; RAID 2002, LNCS 2516, pp. 36-53, 2002.*

(Continued)

*Primary Examiner* — Carl Colin
*Assistant Examiner* — Chau Le
(74) *Attorney, Agent, or Firm* — Baker Botts L.L.P.

(57) ABSTRACT

A method for combating malicious programs including monitoring network traffic from one or more devices, analyzing the network traffic to determine the presence of a malicious program in the one or more devices and disabling transmission of the network traffic for those of the one or more devices determined to have the malicious program present.

50 Claims, 3 Drawing Sheets

U.S. PATENT DOCUMENTS

| | | | |
|---|---|---|---|
| 2003/0145225 A1* | 7/2003 | Bruton et al. | 713/201 |
| 2003/0159070 A1* | 8/2003 | Mayer et al. | 713/201 |
| 2003/0172292 A1 | 9/2003 | Judge | 713/200 |
| 2003/0196095 A1 | 10/2003 | Jeffries et al. | |
| 2003/0204619 A1* | 10/2003 | Bays | 709/238 |
| 2003/0212913 A1 | 11/2003 | Vella | 713/202 |
| 2004/0047356 A1 | 3/2004 | Bauer | 370/401 |
| 2004/0181664 A1* | 9/2004 | Hoefelmeyer et al. | 713/157 |
| 2005/0108393 A1* | 5/2005 | Banerjee et al. | 709/225 |
| 2005/0251854 A1* | 11/2005 | Shay | 726/2 |
| 2005/0265331 A1* | 12/2005 | Stolfo | 370/389 |

FOREIGN PATENT DOCUMENTS

| | | | |
|---|---|---|---|
| WO | WO 02/23805 A2 | 3/2002 | |
| WO | WO 02/37755 A2 | 5/2002 | |
| WO | WO 03/055148 A1 | 7/2003 | |
| WO | WO 03/090426 A1 | 10/2003 | |

OTHER PUBLICATIONS

Ahmed et al; "TCP/IP Protocol Stack Analysis Using MENet"; IEEE 2003; pp. 1329-1333.*

Notification of Transmittal of The International Search Report for application No. PCT/US2005/017601, 7 pages, Sep. 14, 2005.

Written Opinion of the International Searching Authority for application No. PCT/US2005/017601, 5 pages, Sep. 14, 2005.

Notification of Transmittal of International Search Report and Written Opinion; PCT/US2005/017446; 7 pages, Sep. 15, 2006.

Notification of Transmittal of International Search Report and Written Opinion; PCT/US2005/017443; 11 pages, Aug. 24, 2005.

USPTO, Office Action, U.S. Appl. No. 11/132,611, dated Mar. 23, 2009.

USPTO Office Action, U.S. Appl. No. 10/849,633, dated Jul. 11, 2008.

USPTO Office Action, U.S. Appl. No. 10/849,633, dated Nov. 16, 2007.

USPTO Office Action, U.S. Appl. No. 10/849,633, dated Jun. 15, 2007.

USPTO Office Action, U.S. Appl. No. 10/849,633, dated Feb. 23, 2009.

USPTO Office Action dated Aug. 5, 2009 for U.S. Appl. No. 11/133,962, filing date of May 20, 2005.

USPTO Office Action dated Mar. 1, 2010 for U.S. Appl. No. 11/133,962, filing date of May 20, 2005.

*USPTO; Office Action* for U.S. Appl. No. 10/849,633 in the name of Paul Gassoway; 3 pages, May 6, 2011.

* cited by examiner

INTRUSION DETECTION BASED ON AMOUNT OF NETWORK TRAFFIC

REFERENCE TO RELATED APPLICATION

The present disclosure is based on and claims the benefit of Provisional application Ser. No. 60/573,591 filed May 21, 2004, the entire contents of which are herein incorporated by reference.

BACKGROUND

1. Technical Field

The present disclosure relates to security and, more specifically, to systems and methods of computer security.

2. Description of the Related Art

In today's highly computer dependant environment, computer security is a major concern. The security of computer networks is routinely threatened by computer viruses, Trojan horses, worms and the like. Once computer networks are infected with these malicious programs, the malicious programs may have the ability to damage expensive computer hardware, destroy valuable data, tie up limited computing resources or compromise the security of sensitive information.

Worms can be a particularly catastrophic form of malicious program. Worms can infect a computer network and quickly commandeer network resources to aid in the worm's further propagation. In many cases malicious code, for example worms, propagates so rapidly that network bandwidth can become nearly fully consumed. This consumption of bandwidth can grind network function to a near complete halt threatening the proper function of critical applications. Such a network slowdown can have severe adverse effects even on network systems that are not themselves infected with the malicious program.

After a worm has infected computers and computer networks a destructive payload can then be delivered. Destructive payloads can have many harmful consequences, for example, valuable hardware and/or data can be destroyed, sensitive information can be compromised and network security measures can be circumvented.

To guard against the risk of malicious programs such as worms, businesses may often employ antivirus programs, intrusion detection systems and intrusion protection systems. Antivirus programs are computer programs that can scan computer systems to detect malicious computer code embedded within infected computer files. Malicious code can then be removed from infected files, the infected files may be quarantined or the infected file may be deleted from the computer system. Intrusion detection systems and intrusion protection systems (IDSs) are systems that can be implemented on a computer network that monitor the computer network to detect anomalous traffic that can be indicative of a potential problem, for example a worm infection. IDSs may be either active or passive. Active IDSs may take affirmative measures to remedy a potential infection when found while passive IDSs may be used to alert a network administrator of the potential problem.

IDSs often attempt to identify the presence of network infection by analyzing packets of data that are communicated over the network. Packets are generally examined and compared with signatures of known malicious programs. When a signature matches a packet, the packet may be indicative of a malicious program infection.

IDSs that rely on signatures for the detection of malicious programs must regularly receive and install updated signatures corresponding newly discovered malicious programs. If no signature has been received and installed for a particular malicious program, the IDS might not be able to identify the malicious program.

Modern malicious programs such as worms are able to spread very quickly from computer network to computer network throughout the world. Unfortunately, they can spread so quickly that they can infect many networks before a signature for detecting the malicious program can be developed, distributed and installed.

It is desired that a method and system be used that can slow down the propagation of malicious programs until a suitable signature can be obtained to combat the malicious program. By slowing down the propagation of malicious programs, it is possible that further infection can be limited and network bandwidth can be maintained.

SUMMARY

A method for combating malicious programs including monitoring network traffic from one or more devices, analyzing the network traffic to determine the presence of a malicious program in the one or more devices and disabling transmission of the network traffic for those of the one or more devices determined to have the malicious program present.

A system for combating malicious programs including a monitoring unit for monitoring network traffic from one or more devices, an analyzing unit for analyzing the network traffic to determine the presence of a malicious program in the one or more devices and a disabling unit for disabling transmission of the network traffic for those of the one or more devices determined to have the malicious program present.

A computer system including a processor and a program storage device readable by the computer system, embodying a program of instructions executable by the processor to perform method steps for combating malicious programs, the method including monitoring network traffic from one or more devices, analyzing the network traffic to determine the presence of a malicious program in the one or more devices, and disabling transmission of the network traffic for those of the one or more devices determined to have the malicious program present.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
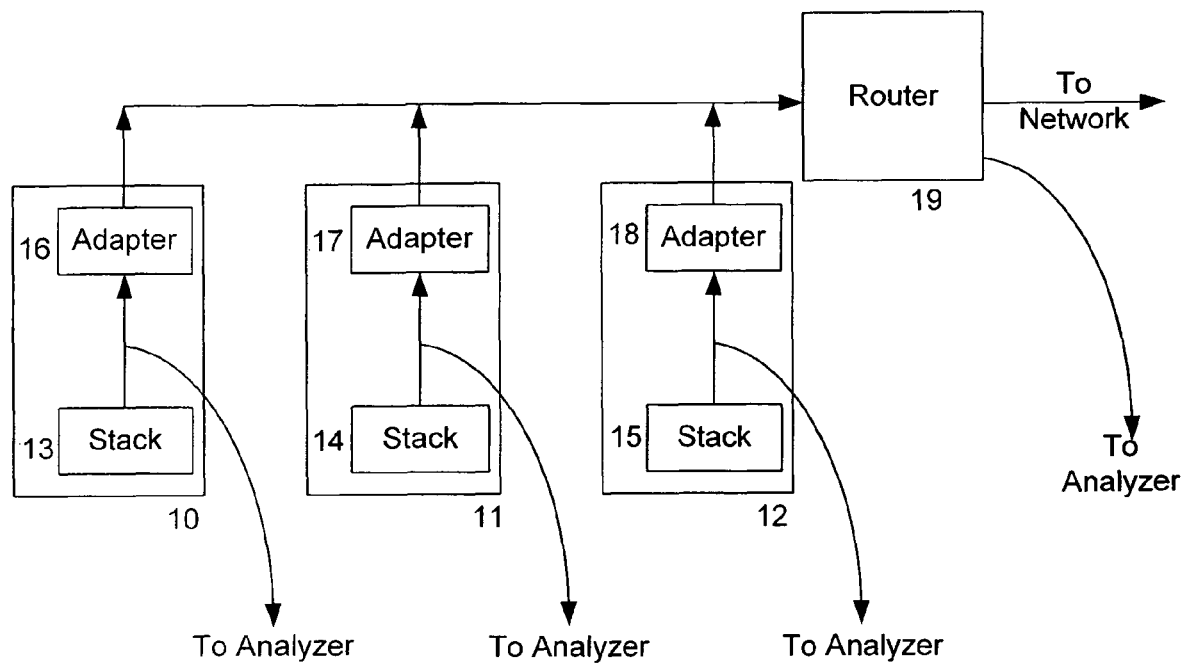
FIG. 1 shows a segment of a computer network according to embodiments of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Destructive payloads and network slowdowns are principal methods in which malicious programs may be able to inflict substantial harm on computer networks. It is desirable to slow down the propagation of malicious programs across a computer network. By slowing down the propagation of malicious programs, the malicious program's consumption of network bandwidth can be reduced and fewer network systems can be infected by the malicious program thereby reducing a network's exposure to the potential for destructive payloads.

Systems for combating malicious programs such as antivirus programs and IDSs are generally effective in combating malicious programs. However, many of these systems rely on the installation of signatures. Signatures are generally available shortly after the discovery of an unknown malicious program, for example, signatures may be available within hours of the discovery of the unknown malicious program. Unfortunately, the ill effects of malicious programs, for example, network slowdowns associated with bandwidth consumption, can be felt immediately and a substantial amount of damage can accrue within the time required to generate and install new signatures.

Embodiments of the present disclosure seek to slow down the propagation of malicious programs, for example worms, until appropriate signatures can be acquired. Embodiments of the present disclosure help to mitigate the damage caused by unknown malicious programs by disconnecting and/or shutting down devices on the network as they become infected. Devices on the network can be network devices, for example a computer connected to the network, and devices can be network connection devices that can be used for routing network traffic across the network, for example, routers.

Embodiments of the present disclosure attempt to discover the propagation of unknown viruses by monitoring the outbound traffic of data packets from one or more devices on the network.

FIG. 1 shows a segment of a computer network according to embodiments of the present disclosure. Three network devices 10-12, which may be, for example, computers, may be connected to the network by a router 19 thereby forming an isolated network segment called a subnet. The network devices 10-12 communicate with the network by sending and receiving packets of data that conform to the set communications protocols used by the network. For example, TCP/IP protocols are commonly used as communications protocols within a network.

The handling of data over the network is generally performed by multiple network layers, each layer responsible for particular network functions, and each layer utilizing one or more protocols from the set of protocols. The network layers are generally hierarchical, with the top layers handling user interaction and the bottom layers handling network hardware. Each layer is dependant on the layer below it and each layer communicates with the layer above and the layer below. Because protocols may be specific to the hierarchical layer in which they occur, the protocols used by the layers are generally hierarchical as well. For this reason, the set of protocols used can be referred to as the protocol stack 13-15.

A device transmits data by forming a packet at the top layers of the protocol stack using the top layer protocols and the packet may be processed, for example, the packet may be passed down the protocol stack (13-15) until it reaches the bottom layer where it may then be sent through the network adapter (16-18) along the network. The network receives data from the network devices 10-12 via the network adapters 16-18. Packets received from the network may be received by the bottom layer of the protocol stack (13-15) and the packet may be processed by passing the packet up the protocol stack (13-15) until it reaches the top layer where it can be utilized.

Embodiments of the present disclosure seek to analyze the data sent from the devices 10-12 so that the presence of a malicious program infection can be discovered. Copies of the outbound packets (e.g., packets being sent by network devices 10-12 across the network) may be analyzed by an analyzer (FIG. 2) which can be connected to the network at any location or within any subnet. Copies of the outbound packets can be monitored by the analyzer at any stage in their transmission. For example, packets can be monitored by the analyzer as they exit the devices 10-12 via the network adapters 16-18. According to an embodiment of the present disclosure, packets may be monitored by the analyzer after the packets have been formed by the protocol stacks 13-15 and before they are received by the network adapters 16-18. According to another embodiment, packets may be monitored by the analyzer after the packets emerge from the router 19. Packets may be analyzed at multiple locations. FIG. 1 shows packets being monitored by the analyzer after formation and prior to entering network adapters 16-18 and as they emerge from the router 19. According to various embodiments of the present disclosure, the analyzer examines packets but does not filter them.

Figure 2:
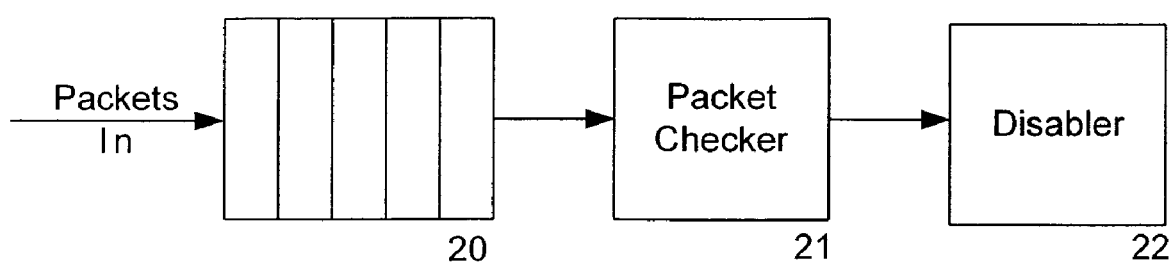
FIG. 2 shows a packet analyzer according to embodiments of the present disclosure.

After packets are received by the analyzer they may be analyzed to identify a potential infection by a malicious program. FIG. 2 shows a packet analyzer according to an embodiment of the present disclosure. Packets that enter the analyzer may be sent to a packet queue 20. The packet queue 20 receives incoming packets and can store them along with the time of the packets' entry. The packet queue 20 may be used as a buffer to hold packets temporarily until the packet checker 21 is ready to analyze the next packet in the queue 20. In the event that the queue 20 is full when a new packet comes in, that new packet may be discarded and not analyzed.

The packet checker 21 analyzes packets and attempts to ascertain if the packets are indicative of a malicious program infection. There are many possible ways in which the packet checker can make this determination and any of these may be utilized by various embodiments of the present disclosure. According to an embodiment of the present disclosure, the packet checker 21 employs a model conformity approach to analyzing packets.

The model conformity approach makes use of the fact that devices infected by a malicious program often utilize as much of the network's resources as possible to propagate the malicious program. This utilization is often very different from the way the device normally utilizes network resources. The model conformity approach to packet analysis compares the packets from a given device with a model that has been developed to represent the normal usage of that given device to ascertain if usage has substantially changed. For example, the packet checker 21 might keep track of the number of packets sent by a given device in a given hour and compare that to the model that represents the normal number of packets sent in a given hour. When the observed rate of sent packets exceeds the model by a margin specified in the model, the packet checker 21 has discovered a potential malicious program infected device.

The model used by the model conformity approach may be determined based on historic values observed by the packet checker 21. For example, the model used may be an average number of packets sent in an hour (an hourly usage rate) as determined over the past month of observation. The margin that may be used in comparing the observed usage against the normal usage model may also be determined based on historic observations. For example, the margin may be a specific number of standard deviations departure from the historically observed average. For example, if the observed rate deviates from the average by 4 or more standard deviations, the packet checker 21 may determine that a malicious program has been detected.

The model conformity approach may use fixed models/margins or dynamic models/margins that are based on historic observations. For example, the model might be predetermined by the network administrator. According to other embodiments of the present disclosure, the model conformity approach may start out using predetermined models/margins but then modify the fixed models and/or margins as historic statistics are ascertained by the packet checker 21.

The model conformity approach need not be limited to analyzing statistics concerning the number of packets observed. Embodiments of the present disclosure may also analyze the form of the packets collected and compare it to the model form for packets from that given device. For example, the packet checker 21 might examine such factors as the size of the packet, the recipient address of the packet, the time of day the packet is being sent, etc. and use that information to ascertain potential malicious activity.

The model conformity approach may use any level of complexity in analyzing the packets and comparing properties of those packets to the model. The model conformity approach may use statistical analysis to analyze packets and compare them with models. For example, statistical comparisons can be used to gauge the degree of similarity between the observed factors and the model. For example, linear regression may be used to determine if the observed usage deviates substantially from the normal usage as indicated by the model thereby indicating a malicious program infection.

Where statistics are used to compare observed usage against normal usage, statistics used to characterize the packets and the models may be, for example, overall averages, for example, the average rate of packet sending, or the statistics used may relate to a given time or day of the week or year. Multiple statistics can be combined to create a multifaceted model that can be used to compare observed packets in any number of ways to determine if there is a substantial deviation between observed usage and normal usage.

The model conformity approach may use artificial intelligence to determine if there is a substantial deviation. For example, neural networks and/or Bayesian analysis may be used to determine if there is a substantial deviation between observed usage and normal usage.

The model conformity approach may be used to generate a deviation score. This score represents the degree of deviation between the observed usage and normal usage. The score can be checked against an acceptable score to ascertain if a malicious program may be present. By modifying the score, the sensitivity of the approach can be adjusted.

Other approaches for determining if the packets are indicative of a malicious program infection may be used. For example, heuristic recognition approaches may be used to recognize characteristics indicative of malicious program infection. Heuristic recognition scans may be able to intelligently estimate whether packets evidence a malicious program infection. This technique relies on programmed logic, called heuristics, to make its determinations.

For example, the packet checker 21 can monitor packet traffic at multiple subnets to detect a sudden, unusual and/or large proliferation of similar packets. Such proliferation may be indicative of a malicious program infection.

When the packet checker has determined that particular devices or connections have become infected with a malicious program, the disabler 22 sends instructions to the infected devices instructing them to stop sending packets thereby disabling the transmission of packets. For example, where a device, for example a computer, has been determined to be infected, the disabler 22 may send instructions for that computer to power down or to otherwise remove itself from the network, for example by deactivating its network adapter. For example, where a device, for example a router, has been determined to be responsible for transmitting infected packets onto the network, the disabler 22 may send instructions for that router to power down or to otherwise stop routing packets. Alternatively, the disabler may remove an infected device from the network by revoking network authentication. The disabler may notify a network administrator that an infected device has been detected, and suggest that the network administrator take the infected machine offline until a signature is available to detect the particular infection on the machine so that the infection can be removed.

After the disabler 22 has disabled the devices believed to be infected with a malicious program, those disabled devices may no longer be able to propagate the malicious program. Therefore, the spread of the malicious program can be, at the very least, slowed down and possibly stopped. Additionally, network bandwidth can be protected so that those devices that remain uninfected might still be able to function normally on the network.

Disabled devices may then be enabled after appropriate remedial measures have been taken or it has otherwise been determined that those devices no longer pose a risk to the network. For example, a network administrator might enable the disabled devices after a signature has been obtained and incorporated into an antivirus program thereby removing the malicious program from the disabled devices. For example, the network administrator may determine that there was no malicious program infection and the disabling had not been necessary.

Figure 3:
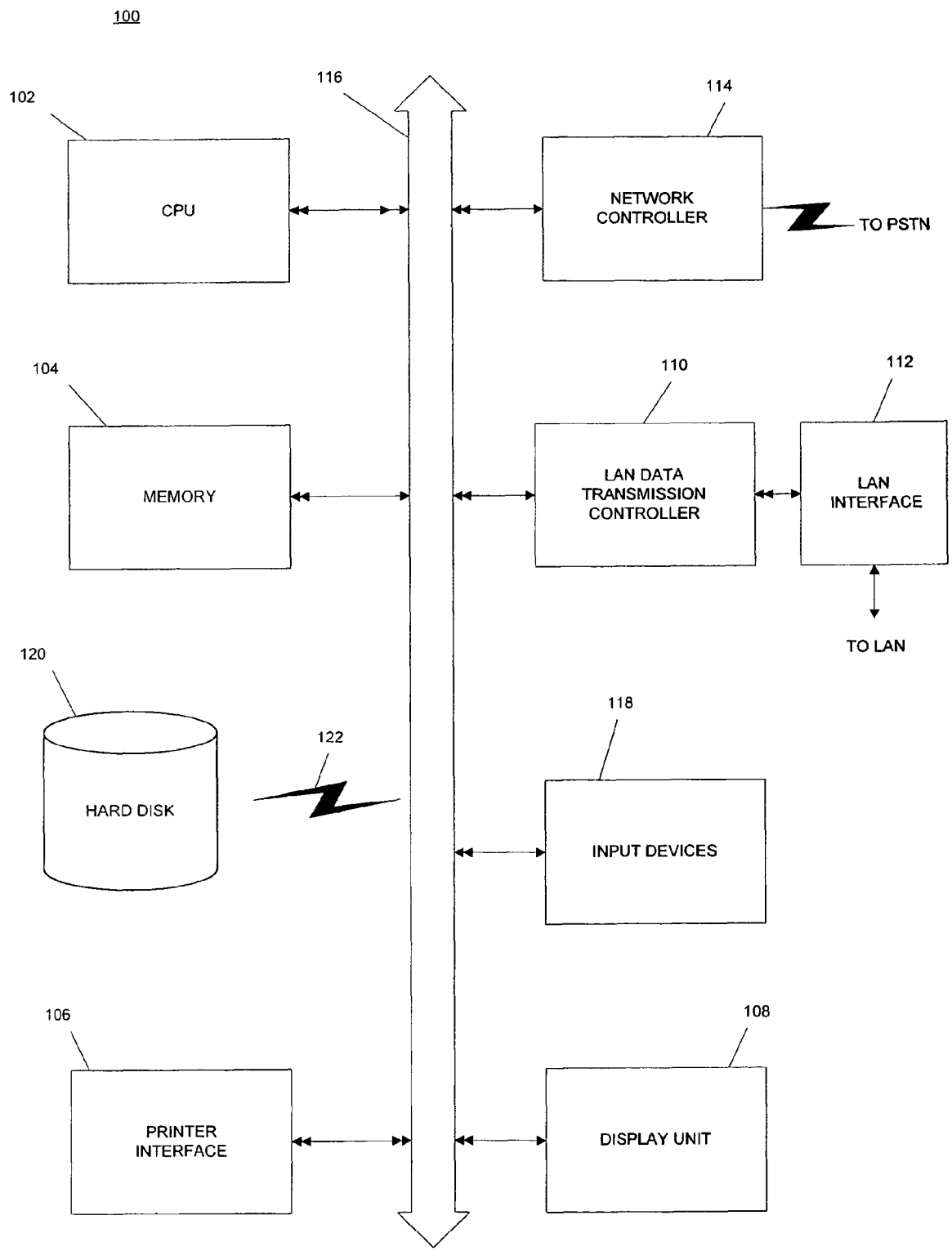
FIG. 3 illustrates an example of a computer system capable of implementing the method and apparatus of the present disclosure.

FIG. 3 depicts an example of a computer system which may implement methods and systems of the present disclosure. The systems and methods of the present disclosure may be implemented in the form of a software application running on a computer system, for example, a mainframe, personal computer (PC), handheld computer, server, etc. The software application may be stored on a recording media (described in further detail below with respect to data storage device 120) locally accessible by the computer system and accessible via a hard wired or wireless connection to a network, for example, a local area network, or the Internet.

The computer system referred to generally as system 100 may include, for example, a central processing unit (CPU) 102, random access memory (RAM) 104, a printer interface 106, a display unit 108, a local area network (LAN) data transmission controller 110, a LAN interface 112, a network controller 114, an internal buss 116, and one or more input devices 118, for example, a keyboard, mouse etc. As shown, the system 100 may be connected to a data storage device, for example, a hard disk, 120 via a link 122.

What is claimed is:

1. A method for combating malicious programs, the method comprising:
   maintaining a network model representing a normal usage of network resources by a device, the network model predetermined by a user, the network model identifying a predetermined number of packets to be transmitted in a predetermined period of time by the device;
   monitoring network traffic generated by the device;
   based on the network traffic that is monitored, identifying an average number of packets actually transmitted in the predetermined period of time by the device;

modifying the network model by replacing the predetermined number of packets identified in the network model with the average number of packets actually transmitted by the device;

after the modification of the network model, monitoring network traffic from the device;

after the modification of the network model, determining that the device is transmitting an observed amount of network traffic that is greater than the average number of packets identified by the network model as modified, the observed amount of network traffic being greater than the average number of packets by a margin of a specified number of standard deviations; and disabling transmission of said network traffic for said device determined to be transmitting the observed amount of network traffic that is greater than the average number of packets by the margin of a specified number of standard deviations.

2. The method of claim 1, wherein analyzing said network traffic to determine the presence of a malicious program in said device:

comparing observed network traffic for the device to network traffic model as modified for said device; and determining that a malicious program is present when said observed network traffic deviates substantially from said network traffic model as modified.

3. The method of claim 2, wherein statistical analysis is used to compare and determine.

4. The method of claim 2, wherein artificial intelligence is used to compare and determine, the artificial intelligence comprising at least one of a neural network and Bayesian analysis.

5. The method of claim 2, wherein determining that a malicious program is present when said observed network traffic deviates substantially from said network traffic model as modified comprises ascertaining if said observed network traffic deviates from said normal network traffic by at least a determined margin.

6. The method of claim 5, wherein said determined margin is predetermined and fixed.

7. The method of claim 5, wherein said determined margin is determined based on historic values observed by monitoring network traffic.

8. The method of claim 5, wherein said determined margin is initially predetermined by a user and is subsequently modified to adjust a sensitivity of an analyzer for determining the presence of said malicious program based on historic values observed by monitoring network traffic.

9. The method of claim 2, wherein said network traffic model is determined based on historic values observed by monitoring network traffic.

10. The method of claim 2, wherein said network traffic model is initially predetermined and is subsequently modified based on historic values observed by monitoring network traffic.

11. The method of claim 1, wherein disabling transmission of said network traffic for the device determined to have said malicious program present comprises powering down said device determined to have said malicious program present.

12. The method of claim 1, wherein disabling transmission of said network traffic for the device determined to have said malicious program present comprises removing from said network said those of said device determined to have said malicious program present.

13. The method of claim 1 wherein analyzing said network traffic comprises analyzing a factor selected from the group consisting of a size of a packet of the network traffic, a recipient address, and a time of day that the packet is being sent.

14. The method of claim 1, further comprising:

generating a deviation score for said network traffic, the deviation score representing the degree of deviation between the observed usage and normal usage; and comparing the deviation score against an acceptable score to determine the presence of a malicious program in said device.

15. The method of claim 14 wherein linear regression is used to check the deviation score against the acceptable score to determine the presence of the malicious program in said device.

16. The method of claim 1, wherein disabling transmission of said network traffic for said device determined to have said malicious program present comprises revoking network authentication granted to said device determined to have said malicious program present.

17. A system for combating malicious programs comprising:

a computer system operable to execute a software application stored on a recording media locally accessible to the computer system, the software application operable when executed by the computer system to:

maintain a network model representing a normal usage of network resources by a device, the network model predetermined by a user, the network model identifying a predetermined number of packets to be transmitted in a predetermined period of time by the device;

monitor network traffic generated by the device;

based on the network traffic that is monitored, identify an average number of packets actually transmitted in the predetermined period of time by the device;

modify the network model by replacing the predetermined number of packets identified in the network model with the average number of packets actually transmitted by the device;

after the modification of the network model, monitor network traffic from the device;

after the modification of the network model, determine that the device is transmitting an observed amount of network traffic that is greater than the average number of packets identified by the network model as modified, the observed amount of network traffic being greater than the average number of packets by a margin of a specified number of standard deviations; and disable transmission of said network traffic for said device determined to be transmitting the observed amount of network traffic that is greater than the average number of packets by the margin of a specified number of standard deviations.

18. The system of claim 17, wherein analyzing said network traffic to determine the presence of a malicious program in said device comprises:

comparing observed network traffic for the device to the network traffic model for said device; and determining that a malicious program is present when said observed network traffic deviates substantially from said network traffic model.

19. The system of claim 18, wherein statistical analysis is used to compare and determine.

20. The system of claim 18, wherein artificial intelligence is used to compare and determine, the artificial intelligence comprising at least one of a neural network and Bayesian analysis.

21. The system of claim 18, wherein determining that a malicious program is present when said observed network traffic deviates substantially from said network traffic model comprises ascertaining if said observed network traffic deviates from said network traffic model by at least a determined margin.

22. The system of claim 21, wherein said determined margin is determined based on historic values observed by monitoring network traffic.

23. The system of claim 21, wherein said determined margin is initially predetermined by the user and is subsequently modified to adjust a sensitivity of an analyzer for determining the presence of said malicious program based on historic values observed by monitoring network traffic.

24. The system of claim 21, wherein said determined margin is determined based on historic values observed by monitoring network traffic.

25. The system of claim 18, wherein said network traffic model is initially predetermined and is subsequently modified based on historic values observed by monitoring network traffic.

26. The system of claim 17, wherein disabling transmission of said network traffic for the device determined to have said malicious program present comprises powering down said the device determined to have said malicious program present.

27. The system of claim 17, wherein disabling transmission of said network traffic for those of said device determined to have said malicious program present comprises removing from said network said device determined to have said malicious program present.

28. A computer system comprising:
a processor; and
a program storage device readable by the computer system, embodying a program of instructions executable by the processor to perform a method for combating malicious programs, the method comprising:
maintaining a network model representing a normal usage of network resources by a device, the network model predetermined by a user, the network model identifying a predetermined number of packets to be transmitted in a predetermined period of time by the device;
monitoring network traffic generated by the device;
based on the network traffic that is monitored, identifying an average number of packets actually transmitted in the predetermined period of time by the device;
modifying the network model by replacing the predetermined number of packets identified in the network model with the average number of packets actually transmitted by the device;
after the modification of the network model, monitoring network traffic from the device;
after the modification of the network model, determining that the device is transmitting an observed amount of network traffic that is greater than the average number of packets identified by the network model as modified, the observed amount of network traffic being greater than the average number of packets by a margin of a specified number of standard deviations; and
disabling transmission of said network traffic for said device determined to be transmitting the observed amount of network traffic that is greater than the average number of packets by the margin of a specified number of standard deviations.

29. The computer system of claim 28, wherein analyzing said network traffic to determine the presence of a malicious program in said devices comprises:
comparing observed network traffic for the device to the network traffic model for said device; and
determining that a malicious program is present when said observed network traffic deviates substantially from said network traffic model.

30. The computer system of claim 29, wherein statistical analysis is used to compare and determine.

31. The computer system of claim 29, wherein artificial intelligence is used to compare and determine, the artificial intelligence comprising at least one of a neural network and Bayesian analysis.

32. The computer system of claim 29, wherein determining that a malicious program is present when said observed network traffic deviates substantially from said network traffic model comprises ascertaining if said observed network traffic deviates from said network traffic model by at least a determined margin.

33. The computer system of claim 32, wherein said determined margin is determined based on historic values observed by monitoring network traffic.

34. The computer system of claim 32, wherein said determined margin is initially predetermined by the user and is subsequently modified to adjust a sensitivity of an analyzer for determining the presence of said malicious program based on historic values observed by monitoring network traffic.

35. The computer system of claim 32, wherein said predetermined margin is determined based on historic values observed by monitoring network traffic.

36. The computer system of claim 29, wherein said normal network traffic model is initially predetermined and is subsequently modified based on historic values observed by monitoring network traffic.

37. The computer system of claim 28, wherein disabling transmission of said network traffic for said device determined to have said malicious program present comprises powering down said those of said device determined to have said malicious program present.

38. The computer system of claim 28, wherein disabling transmission of said network traffic for said device determined to have said malicious program present comprises removing from said network said those of said device determined to have said malicious program present.

39. A non-transitory computer recording medium including computer executable code for combating malicious programs, the computer executable code comprising:
code for maintaining a network model representing a normal usage of network resources by a device, the network model predetermined by a user, the network model identifying a predetermined number of packets to be transmitted in a predetermined period of time by the device;
code for monitoring network traffic generated by the device;
code for identifying, based on the network traffic that is monitored, an average number of packets actually transmitted in the predetermined period of time by the device;
code for modifying the network model by replacing the predetermined number of packets identified in the network model with the average number of packets actually transmitted by the device;
code for monitoring network traffic from the device after the modification of the network model;
code for determining, after the modification of the network model, that the device is transmitting an observed amount of network traffic that is greater than the average number of packets identified by the network model as modified, the observed amount of network traffic being greater than the average number of packets by a margin of a specified number of standard deviations; and code for disabling transmission of said network traffic for said device determined to be transmitting the observed amount of network traffic that is greater than the average number of packets by the margin of a specified number of standard deviations.

40. The non-transitory computer recording medium of claim 39, wherein said code for analyzing said network traffic to determine the presence of a malicious program in said device comprises:

code for comparing observed network traffic for the device to the network traffic model for said device; and code for determining that a malicious program is present when said observed network traffic deviates substantially from said network traffic model.

41. The non-transitory computer recording medium of claim 40, wherein statistical analysis is used to compare and determine.

42. The non-transitory computer recording medium of claim 40, wherein artificial intelligence is used to compare and determine, the artificial intelligence comprising at least one of a neural network and Bayesian analysis.

43. The non-transitory computer recording medium of claim 40, wherein said network traffic model is initially predetermined and is subsequently modified based on historic values observed by monitoring network traffic.

44. The non-transitory computer recording medium of claim 39 wherein said code for determining that a malicious program is present when said observed network traffic deviates substantially from said network traffic model comprises code for ascertaining if said observed network traffic deviates from said network traffic model by at least a determined margin.

45. The non-transitory computer recording medium of claim 44, wherein said determined margin is determined based on historic values observed by monitoring network traffic.

46. The non-transitory computer recording medium of claim 44, wherein said determined margin is initially predetermined by the user and is subsequently modified to adjust a sensitivity of an analyzer for determining the presence of said malicious program based on historic values observed by monitoring network traffic.

47. The non-transitory computer recording medium of claim 44, wherein said determined margin is determined based on historic values observed by monitoring network traffic.

48. The non-transitory computer recording medium of claim 39, wherein said code for disabling transmission of said network traffic for those of said device determined to have said malicious program present comprises code for powering down said device determined to have said malicious program present.

49. The non-transitory computer recording medium claim 39, wherein said code for disabling transmission of said network traffic for said device determined to have said malicious program present comprises code for removing from said network said device determined to have said malicious program present.

50. A method for combating malicious programs, the method comprising:

maintaining a network model representing a normal usage of network resources by a device, the network model predetermined by a network administrator, the network model identifying a predetermined number of packets to be transmitted in a predetermined period of time by the device;

monitoring network traffic from the device;

based on the network traffic that is monitored, identifying an average number of packets actually transmitted in the predetermined period of time by the device;

modifying the network model by replacing the predetermined number of packets identified by the network administrator with an average number of packets actually transmitted in the predetermined period of time by the device;

after the modification of the network model, monitoring network traffic from the device;

after the modification of the network model, determining that the device is transmitting an observed amount of network traffic that is greater than the average number of packets identified by the network model as modified, the observed amount of network traffic being greater than the average number of packets by a margin of a specified number of standard deviations; and disabling transmission of said network traffic for said device determined to be transmitting the observed amount of network traffic that is greater than the average number of packets by the margin of a specified number of standard deviations.

\* \* \* \* \*